United States Patent
Jennings, III et al.

(10) Patent No.: US 8,650,259 B2
(45) Date of Patent: Feb. 11, 2014

(54) METHOD AND APPARATUS FOR INCREASING THE SEARCH SPACE OR PEER-TO-PEER NETWORKS USING TIME-TO-LIVE BOOSTING

(75) Inventors: Raymond B. Jennings, III, Ossining, NY (US); Jason D. LaVoie, Mahopac, NY (US)

(73) Assignee: International Business Machines Corporation, Armonk, NY (US)

(*) Notice: Subject to any disclaimer, the term of this patent is extended or adjusted under 35 U.S.C. 154(b) by 2188 days.

(21) Appl. No.: 11/049,808

(22) Filed: Feb. 3, 2005

(65) Prior Publication Data

US 2006/0173967 A1    Aug. 3, 2006

(51) Int. Cl.
*G06F 15/16* (2006.01)

(52) U.S. Cl.
USPC ............................................ 709/208

(58) Field of Classification Search
USPC ............................................ 709/208
See application file for complete search history.

(56) References Cited

U.S. PATENT DOCUMENTS

| | | | |
|---|---|---|---|
| 6,636,854 B2 * | 10/2003 | Dutta et al. | 707/10 |
| 7,117,264 B2 * | 10/2006 | Becker et al. | 709/227 |
| 7,383,433 B2 * | 6/2008 | Yeager et al. | 713/157 |
| 2002/0143989 A1 * | 10/2002 | Huitema et al. | 709/243 |
| 2003/0050966 A1 * | 3/2003 | Dutta et al. | 709/203 |
| 2003/0050980 A1 * | 3/2003 | Dutta et al. | 709/205 |
| 2003/0131129 A1 * | 7/2003 | Becker et al. | 709/238 |
| 2003/0182428 A1 * | 9/2003 | Li et al. | 709/227 |
| 2004/0122958 A1 * | 6/2004 | Wardrop | 709/229 |
| 2005/0010685 A1 * | 1/2005 | Ramnath et al. | 709/238 |
| 2005/0060432 A1 * | 3/2005 | Husain et al. | 709/246 |
| 2005/0289339 A1 * | 12/2005 | Walker | 713/153 |

* cited by examiner

*Primary Examiner* — Mohamed Ibrahim
*Assistant Examiner* — Thomas Richardson
(74) *Attorney, Agent, or Firm* — Scully, Scott, Murphy & Presser, P.C.; Louis J. Percello, Esq.

(57) ABSTRACT

Disclosed are methods and systems for expanding the search space in a Peer-to-Peer ("P2P") network. In one embodiment, the search space is expanded by increasing the time-to-live value of the search request message. The P2P network may include a plurality of nodes, and the method for increasing the search space in the network includes the steps of receiving a search request message; changing a time-to-live value carried by the message; and forwarding the message to at least one peer node.

7 Claims, 3 Drawing Sheets

METHOD AND APPARATUS FOR INCREASING THE SEARCH SPACE OR PEER-TO-PEER NETWORKS USING TIME-TO-LIVE BOOSTING

BACKGROUND OF THE INVENTION

1. Field of the Invention

The present invention relates generally to computing networks such as peer-to-peer networks. It more particularly relates to data transfer among computers such that a search space may be expanded by increasing the time to live for a query message based on responses to the search.

2. Description of Related Art

Peer-to-peer ("P2P") networks are most commonly used for transferring music files over the Internet. While swapping music files has made P2P networks popular, it is expected that such networks will become increasingly popular for transferring other types of files.

The location of data (e.g., files) in the network may not be known beforehand and is rarely centralized. A search request is spread through the network until it reaches the location containing the requested data or until the request "dies." The requested data may be located in P2P nodes associated with a subset of users. As the P2P networks gain more popularity, more users will connect to the network, causing increased network traffic and potential congestion.

The addition of new users to the network is desirable to the extent that it represents new sources of data. Adding users, however, does not guarantee that the location of the potential new sources of data will be easily accessible to all other users. For example, a request may die before reaching the location of a requested file. Consequently, there is a need in the art for methods and systems that enable the efficient data search in a P2P network without grossly affecting the network's traffic.

SUMMARY OF THE INVENTION

In one embodiment, the present invention includes a method and apparatus for increasing the search space for P2P networks. A query's search space may be expanded by increasing the time-to-live ("TTL") in the query message so that the query messages survive longer in the network, thereby reaching more potential responders. The decision to increase the TTL may be done by the nodes in the P2P networks at the requestor's edge of the network. If a minimum number of nodes on the query's path have responded to the query, then the edge node may apply the increase to the TTL field in the query message and continue to broadcast the query.

DETAILED DESCRIPTION OF THE PREFERRED EMBODIMENT

Reference will now be made in detail to an implementation of the present invention as illustrated in the accompanying drawings. Wherever possible, the same reference numbers will be used throughout the drawings and the following description to refer to the same or like parts.

Figure 1:
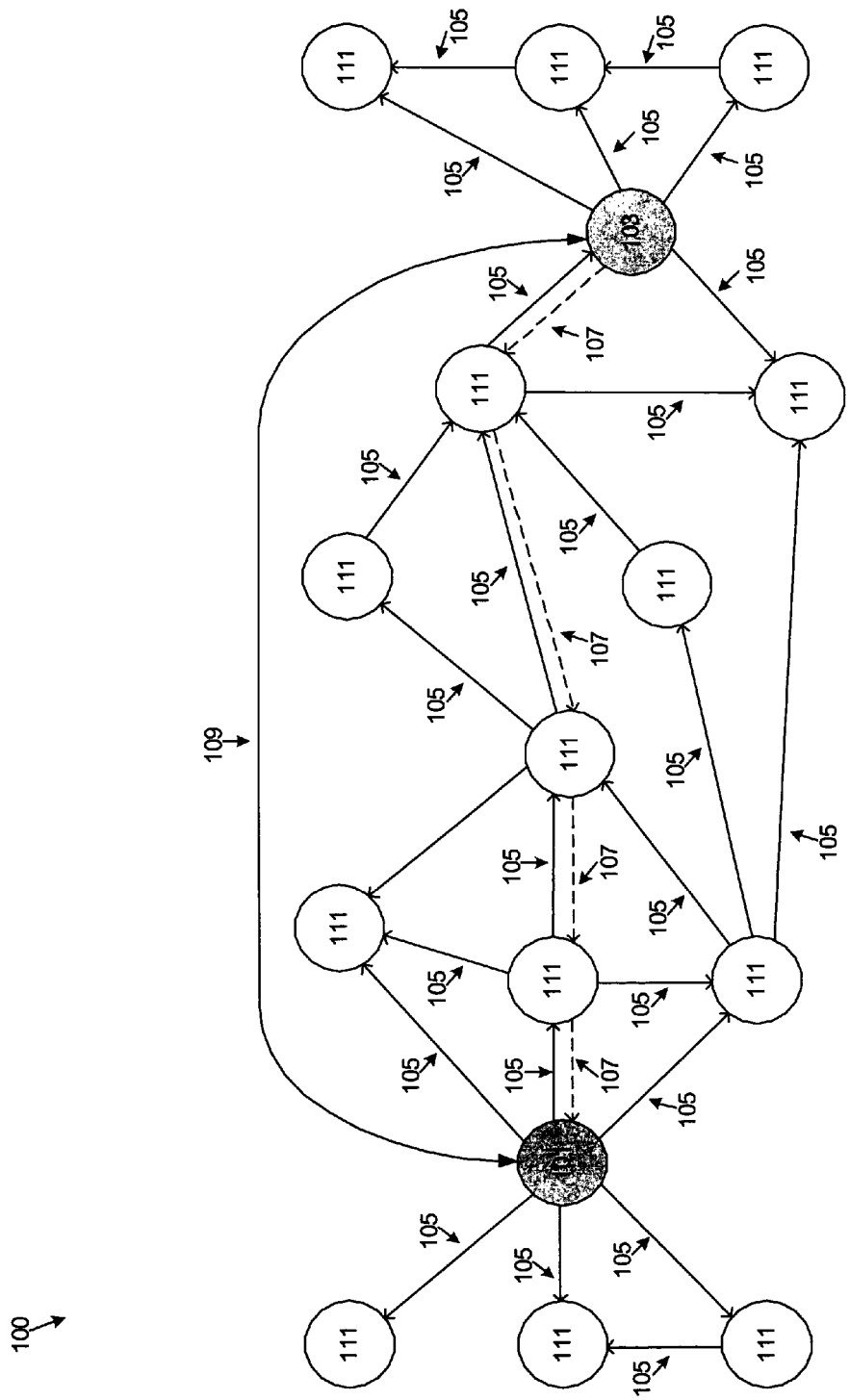
FIG. 1 illustrates a network of nodes participating in a P2P manner, a search message is broadcast from the originator node, a response message is returned to the originator, and a data transfer from the responder (sender) node to the originator (receiver) node in accordance with one embodiment of the present invention.

In one embodiment, the present invention provides a method and apparatus for expanding the search space for requests. FIG. 1 shows a schematic diagram of a network 100 in which the present invention may be implemented. The network 100 includes a set of computer nodes connected in a manner such that each node has at least one connection to another node.

The requestor node 101 may send a search request message 105 on the network to all nodes connected to the requester. The request message may contain key words that the requestor node 101 is attempting to locate. Each subsequent node in network 100 forwards the search request 105 to other neighbor nodes. A responding node 103 may be defined as the node having the data that the requesting node 101 searches for. The responding node 103 responds by sending a response message 107 back to the requesting node 101. In other embodiments, there may be numerous nodes that respond to a particular request, i.e., responding nodes.

The requesting node 101 may then request the data corresponding to the search results from the responding node 103 by making a connection 109 to the responding node 103. In one embodiment of the invention, the connection may be a TCP connection. Every request message 105 from node 101 may reach the exact same peer nodes. A peer node may be defined as a node within the P2P network. There are a number of P2P protocols known in the art. The Gnutella P2P protocol, for example, may be used with the present invention.

The request message 105 may include a TTL field to indicate how many hops (or distance in nodes) away from the requestor 101 a request message 105 can travel before the request message is disregarded by a node.

In FIG. 1, the responding node 103 is four hops away from requesting node 101. If the request message 105 has a TTL of three, then the responding node 103 would not receive the request message 105 and would not have responded to that request. The TTL may be used to limit the time a request message 105 is in the network 100. If no other node had the desired content besides the previously noted responding node 103 in the example illustrated in FIG. 1, and the TTL was three, then the requesting node would not receive any responses even though the desired content is only one more hop away (at four hops).

Figure 2:
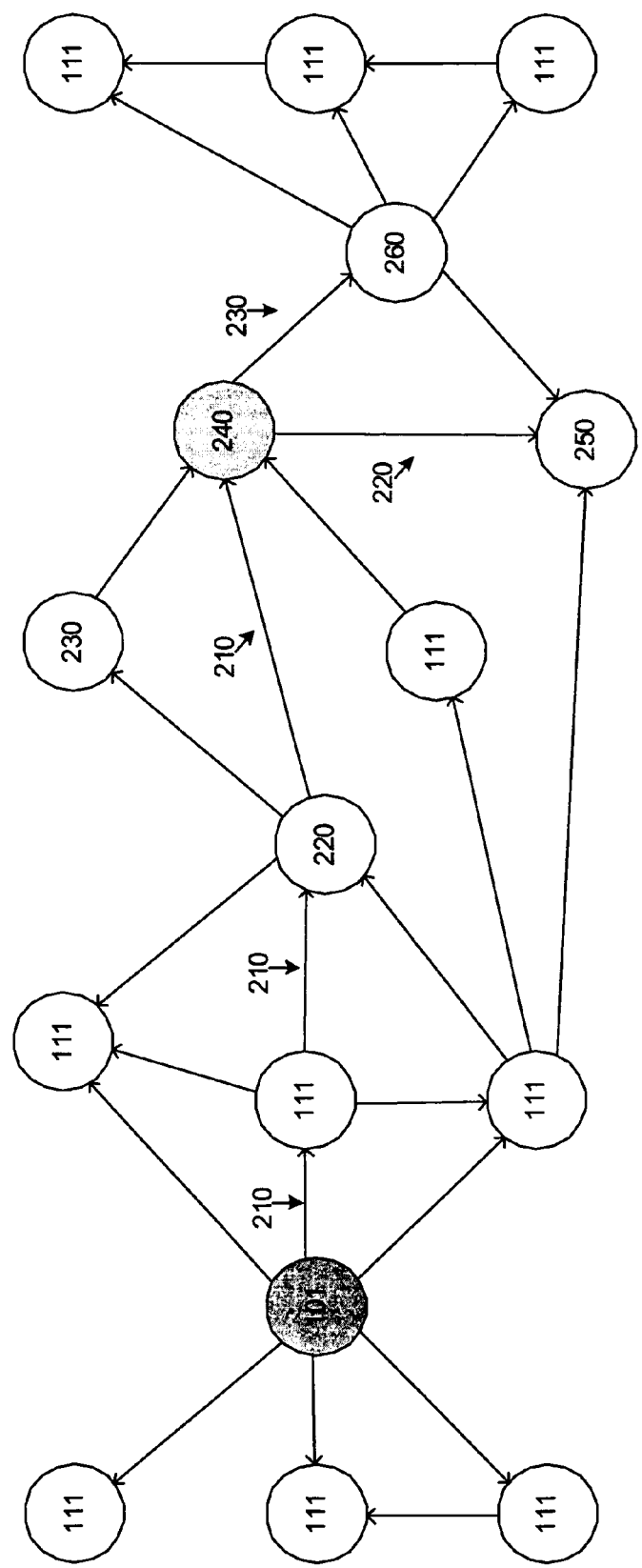
FIG. 2 illustrates a network with nodes beyond the standard reach of a requestor node receiving the request in accordance with one embodiment of the present invention.

As illustrated in FIG. 2, a request message travels along a path 210 in the network for three hops ending at an edge node 240. An edge node may be defined as the node where the TTL of a request message becomes zero. In other embodiments, there may be numerous edge nodes performing similar actions. A count of how many nodes along the path 210 have responded to the request before forwarding the message along may be embedded in each request message. If that count is below a threshold specified in the message or by the user of that edge node 240, then the edge node 240 may increase the TTL some amount specified by the user of that node, and then forwards the message to neighbors 250, 260 that would not have usually seen a message from the original requestor 101. By increasing the TTL, the number of edge nodes increase, i.e., the search space is increased.

Depending on the TTL value set by the edge node 240, the peers 250, 260 may continue to pass the request message along to their neighbors. That provides other nodes with the opportunity to respond to the requestor 101, in turn giving the requester 101 more results with minimal increase in network traffic. It also provides the ability to take control away from the originator. Since a threshold is used, the edge node 240 does not respond if the embedded count in the request message 105 indicates the requestor 101 has results.

Figure 3:
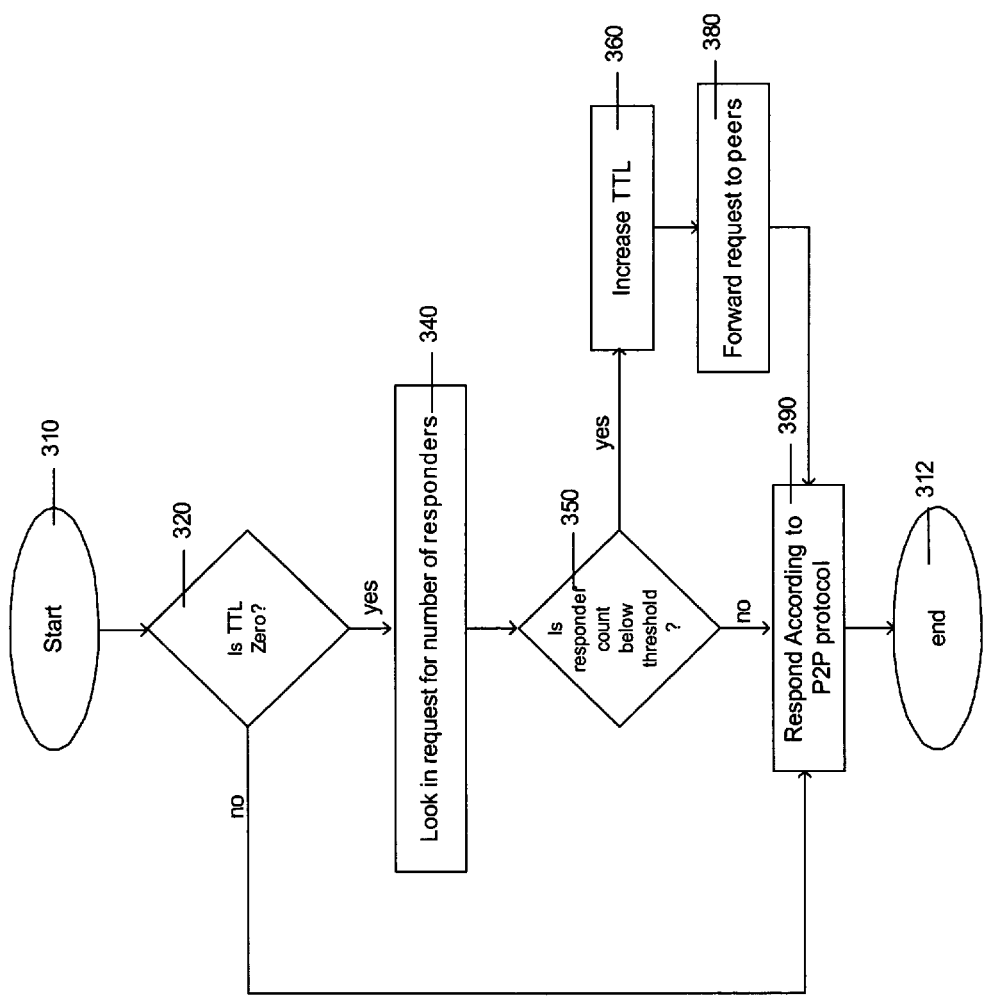
FIG. 3 is a flowchart with the steps used by a node to determine when to increase a request's TTL field in a packet in accordance with one embodiment of the present invention.

FIG. 3 is a flowchart outlining the methodology of one embodiment of the present invention. The illustrated method pertains to determining when a TTL is increased. The method starts (step 310) when a request message 105 is received. The message is inspected to determine if the TTL of the request message 105 is zero (step 320). If the TTL is not zero, then the node may continue as specified by the P2P protocol (step 390); and if the node should respond to the request, then the responder count in the respond message is increased before forwarding the message to peers. If the TTL in the request message is zero, then the responder count is read (step 340) and compared against a threshold (step 350) specified by the request message or by the user of the node.

If the response count is not below the specified threshold, then the requesting node 101 potentially has received many responses. In that event, the method continues to respond to the request message according to the P2P protocol 390 (e.g., do nothing if there is no match to the request message 105 or respond if content does match). If the response count is below the specified threshold, then the TTL for the request message 105 is increased (step 360) by an amount that may be specified by the user, and then the request message 105 is forwarded to those peers that have not yet received the request. After forwarding the request message, the method continues with regular P2P processing 390. After responding to the request message 105 according to the P2P protocol 390, the method ends.

In another exemplary embodiment of the present invention, if the P2P application or the protocol does not support the response count field, a TTL increase decision may be based upon the search request and if any search responses for that request have been seen within a given time period.

In still another exemplary embodiment of the present invention invention, if the P2P application or the protocol does not support the response count field, a TTL increase decision can be made by contacting the requesting node 101 and querying the amount of responses received so far. If the number of responses is low, then the TTL increase can be applied.

In another exemplary embodiment of the present invention, nodes in the network other than said edge nodes can apply a TTL increase according to a probability based upon the response count field and the current TTL. For example, the lower the TLL and response count, the higher the probability a non-edge node may increase the TTL.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

Having thus described our invention, what we claim as new and desire to secure by Letters Patent is as follows:

1. In a peer-to-peer network comprising a plurality of nodes, a method for increasing a search space in the network comprising steps of:
   receiving a search request message at a peer node within said peer-to-peer network, said search request message including a time-to-live value;
   decrementing the time-to-live at every peer node receiving the search request message;
   incrementing the time-to-live value in the message at an edge node where the time-to-live value of the message becomes zero; and
   forwarding the message to at least one other peer node that has not received the message, wherein said incrementing and said forwarding increase a number of edge nodes, thereby expanding said search space in said peer-to-peer network;
   retrieving from the message a count of the number of nodes along the message's path that have responded to the request before forwarding the message to the at least one peer node; and
   comparing that count with a threshold, the threshold being different from the time-to-live value; and
   increasing the time-to-live value in the message if the count is below the threshold.

2. The method of claim 1, wherein the count is increased before forwarding the message to the at least one peer node.

3. The method of claim 1, wherein the threshold is specified in the message.

4. In a peer-to-peer network comprising a plurality of nodes, a method for increasing a search space in the network comprising steps of:
   receiving a search request message at a peer node within said peer-to-peer network, said search request message including a time-to-live value;
   responding to a requester node from which the search request message is originated and increasing a responder count if said peer node has data that which requestor node searches for;
   decrementing the time-to-live value in the message at said peer node;
   determining at said peer node if the time-to-live value in the message is zero; and
   if the time-to-live value is zero,
      reading the responder count;
      comparing the count with a threshold being different from the time-to-live value;
      increasing the time-to-live value in the message if the count is below the threshold;
      forwarding the message to at least one other peer node that has not received the message,
      whereby increasing a number of edge nodes and expanding the search space in the network, the edge nodes representing nodes where the time-to-live value of the message becomes zero; and if the time-to-live value is larger or smaller than zero, forwarding the message to the at least one other peer node that has not received the message.

5. The method of claim 4, wherein the at least one other peer node is not a node that sent the message.

6. The method of claim 4, wherein the threshold is specified in the message.

7. A computer recordable-type medium storing instructions being executed by a data processing system for causing the data processing system to perform method steps for increasing a search space in a peer-to-peer network, said method steps comprising the steps of claim 4.

* * * * *